United States Patent [19]

Okazaki

[11] Patent Number: 4,986,150
[45] Date of Patent: Jan. 22, 1991

[54] MICRO-POSITIONING TOOL POST

[75] Inventor: Yuichi Okazaki, Tsukuba, Japan

[73] Assignees: Agency of Industrial Science & Technology; Ministry of International Trade & Industry, both of Tokyo, Japan

[21] Appl. No.: 322,725

[22] Filed: Mar. 13, 1989

[30] Foreign Application Priority Data

Mar. 31, 1988 [JP] Japan .................................. 63-80083

[51] Int. Cl.$^5$ ............................................. B23B 21/00
[52] U.S. Cl. ........................................ 82/137; 82/158; 318/561
[58] Field of Search ................. 82/161, 137, 133, 134, 82/119, 141, 118, 117; 219/121.31; 318/561; 364/174

[56] References Cited

U.S. PATENT DOCUMENTS

| | | | |
|---|---|---|---|
| 4,019,015 | 4/1977 | Hassan et al. | 219/121.31 |
| 4,451,892 | 5/1984 | McMurty | 82/117 |
| 4,669,359 | 6/1987 | Shiba | 82/141 |
| 4,672,550 | 6/1987 | Winterbottom | 318/590 |
| 4,741,231 | 5/1988 | Patterson et al. | 82/118 |
| 4,817,007 | 3/1989 | New | 82/118 |

Primary Examiner—D. S. Meislin
Assistant Examiner—John R. Schwarzmann
Attorney, Agent, or Firm—Oblon, Spivak, McClelland, Maier & Neustadt

[57] ABSTRACT

A micro-positioning tool post comprises a flexible support which performs parallel motion and supports a tool, a piezoelectric actuator for displacing the flexible support, a displacement sensor for detecting displacement of the tool, and a state observer for receiving the voltage applied to the piezoelectric actuator and the output from the displacement sensor as input, producing an estimate of a velocity signal and feeding back the estimate to the voltage applied to the piezoelectric actuator. The feedback control greatly improves the dynamic stiffness of the tool post while also providing excellent static characteristics, dynamic characteristics and static stiffness.

4 Claims, 5 Drawing Sheets

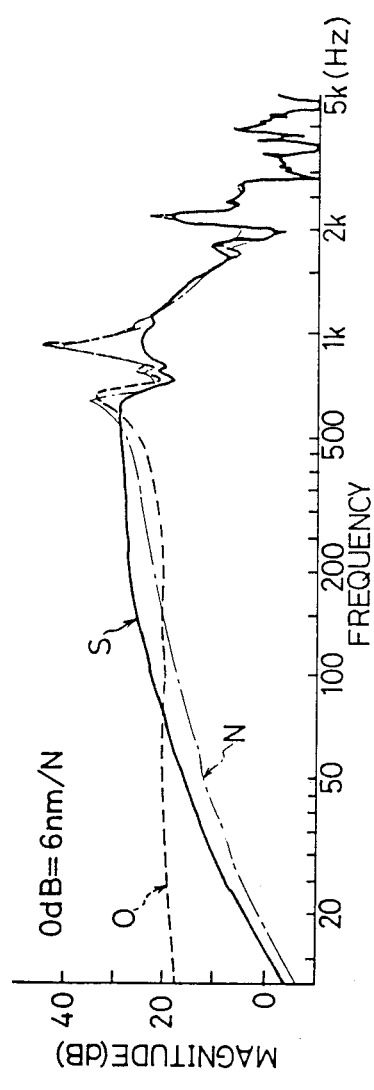
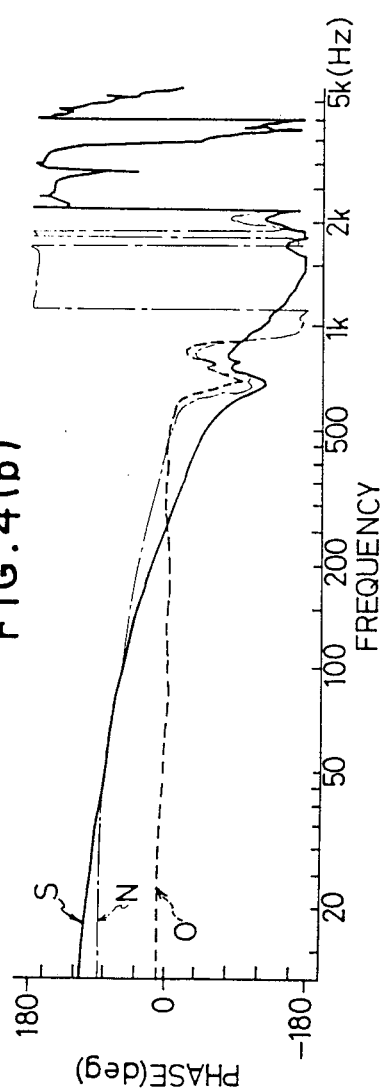
FIG.4(a)
FIG.4(b)

MICRO-POSITIONING TOOL POST

BACKGROUND OF THE INVENTION

1. Field of the Invention

This invention relates to a micro-positioning tool post for precision positioning in ultra-precision machining.

2. Prior Art Statement

For use in ultra-precision machining there is already known a micro-positioning post which uses a piezoelectric actuator for displacing a tool supported on a flexible support.

In this type of micro-positioning post it is necessary to conduct closed-loop control by feeding back the tool displacement to the voltage applied to the piezoelectric actuator. The main reasons for this are (i) that it is not possible to carry out precision positioning of the tool without eliminating the hysteresis characteristics of the piezoelectric device, (ii) that it is necessary to conduct closed-loop control or the like in order to compensate for the insufficient stiffness of the tool stage in the thrust direction, and (iii) that there is a need to suppress the sharp resonance characteristics at the resonance frequency determined by the mass of the spring and moving member.

As shown in FIG. 7, the typical closed-loop control system conventionally employed for coping with these problems includes a notch filter for canceling the resonance of the tool post and in this way smoothing the frequency characteristics. The loop also generally includes an integrator for increasing the loop gain in the low frequency region.

While this type of control system improves the static characteristics (including the hysteresis characteristics), the dynamic characteristics (expressed in terms of the frequency characteristics), and the static stiffness (for minimizing positional change caused by static forces), it does not provide any improvement in the dynamic stiffness required for minimizing positional change caused by external forces (disturbance), which include a variable component.

OBJECT AND SUMMARY OF THE INVENTION

The object of this invention is to provide a micro-positioning tool post with improved dynamic stiffness in addition to outstanding static characteristics, dynamic characteristics and static stiffness.

For achieving this object, the present invention provides a micro-positioning tool post wherein the tool stage is supported on a flexible support which performs parallel motion, the flexible support is displaced by a piezoelectric actuator, the amount of tool stage displacement is detected by a displacement sensor and the detected amount of displacement is used for conducting closed-loop control, the micro-positioning tool post being characterized in that the output from the displacement sensor is input to a state observer, and the state observer produces an estimate of a velocity signal which is fed back to the voltage applied to the piezoelectric actuator for smoothing the frequency response.

When voltage is applied to the piezoelectric actuator, the tool stage is displaced in proportion to the magnitude of the applied voltage. This displacement is detected by the displacement sensor and input to the state observer. The state observer produces an estimate of a velocity signal and this estimate is fed back to the voltage applied to the piezoelectric actuator.

This closed-loop control improves not only the static characteristics, dynamic characteristics and static stiffness but also the dynamic stiffness.

The above and other features of the present invention will become apparent from the following description made with reference to the drawings.

BRIEF EXPLANATION OF THE DRAWINGS

FIGS. 4(a) and 4(b) are graphs comparing the dynamic stiffness of the micro-positioning tool post according to the present invention with those of conventional micro-positioning tool posts employing closed- and open-loop systems, respectively.

DETAILED DESCRIPTION OF THE PREFERRED EMBODIMENT

Figure 1:
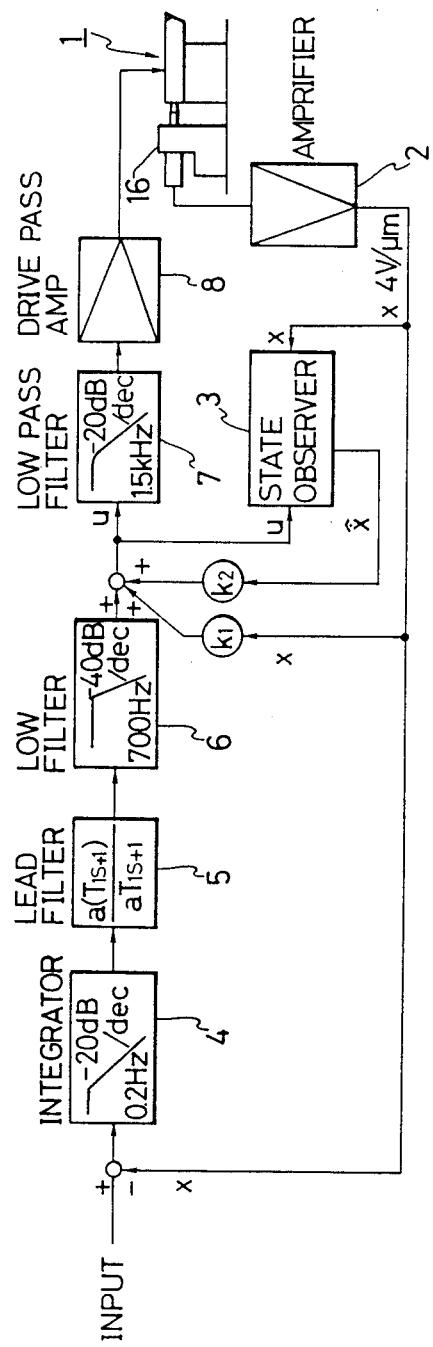
FIG. 1 is a block diagram showing an embodiment of the control system of the micro-positioning tool post according to the present invention.
Figure 2:
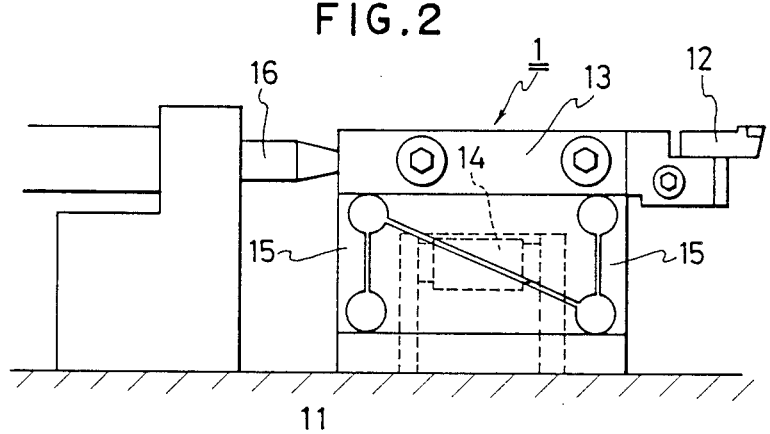
FIG. 2 is a schematic view of the micro-positioning tool post according to this invention.

The constitution of the control system of the micro-positioning tool post according to this invention is illustrated in the block diagram of FIG. 1 and the general structure of the main micro-positioning tool post unit 1 is shown in FIG. 2.

As in the prior art structure, a tool 12 is fixed on a tool stage 13 supported on a pair of flexible supports 15 each constituted as a parallel spring mechanism. The entire arrangement is supported on a base 11. The tool stage 13 is displaced by a piezoelectric actuator 14, thus controlling the position of the tool 12.

When a voltage is applied to the piezoelectric actuator 14, the tool stage 13 is advanced or retracted in accordance with the magnitude of the applied voltage. The resulting displacement of the tool stage 13 is detected, for instance, by a resistance wire strain gage (not shown) adhered to the parallel spring mechanisms or by a non-contact displacement gage 16 and the output of the gage is fed back as a tool stage displacement signal for use in closed-loop control.

The dynamic stiffness of a machine tool system is generally minimum at the system's resonant frequency and the larger the minimum value is, the smaller is the likelihood of the occurrence of chatter. In other words, a large dynamic stiffness is indispensable for conducting stable, high-precision cutting.

The micro-positioning tool post control system shown in FIG. 1 is arranged for enabling the minimum value of the dynamic stiffness to be increased. It does this by using the non-contact displacement gage 16 to detect displacement of the tool stage 13 of the main unit 1, amplifying the output of the non-contact displacement gage 16 in an amplifier 2, forwarding the amplified signal to a state observer 3 which on the basis of the signal input thereto produces an estimate of a tool stage velocity signal, and inputting the estimate of the tool stage velocity signal to the piezoelectric actuator 14 in place of a velocity signal.

In a control system for suppressing resonance, a velocity signal relating to the member to be controlled is ordinarily fed back to the input side. In the case of controlling the rotation of a motor or the like, this velocity signal is derived from the differentiated output of a tachometer generator or a rotary encoder.

Thus where, as in the present invention, the control is conducted with respect to a tool post which is subjected to ultra-precision positioning on the nm order, it is difficult to provide a linear motion type velocity detector of the ultra-high resolution and compact size required for application to the ultra-precision positioning. Moreover, it is not possible to use a rotating type velocity detector such as a tachometer generator in the case of employing a linear motion actuator such as a piezoelectric actuator. As mentioned earlier, the present invention therefore does not use a velocity detector but instead supplies a tool stage displacement signal x and the tool post control input signal u to the state observer which on the basis thereof produces an estimate x of a velocity signal x this estimate is used as the control signal. More specifically, as shown in FIG. 1 by feeding back the displacement signal x and the estimate x the input side at appropriate gains ($k_1$, $k_2$), it is possible to hold the decrease in dynamic stiffness at the resonant frequency of the tool system to the minimum and thus to smooth the frequency characteristics of the tool post and suppress resonance.

As mentioned earlier, the state observer 3 produces an estimate x of a velocity signal based on the displacement signal x and the control signal input to the tool post. The computation in the state observer 3 for producing this estimate will now be explained.

Let the response characteristics of the tool post be $$\ddot{x} + 2\zeta\omega_0\dot{x} + \omega_0^2 x = ku$$

where k, $\zeta$ and $\omega_0$ represent a sensitivity coefficient, a natural damping coefficient and a natural angular frequency, respectively, which are characteristic parameters of the tool post. Then since the dynamical system variable z is represented by $$\dot{z} = (-\omega_0^2 - l)z + (-2\zeta\omega_0 - (\zeta_2 + l)l)x + ku$$

the variable z can be used to obtain the estimate x as $$\dot{x} = z + lx$$

and since the velocity x rapidly converges, x be used as an estimate of velocity x. Here l represents a coefficient for stabilizing the state observer 3, which is an arbitrary positive integer of sufficient magnitude.

This computation can be carried out in the state observer 3 by an analogue or digital arithmetic circuit using an operational amplifier or the like.

The control system shown in FIG. 1 has an integrator 4 wherein the displacement signal output by the non-contact displacement gage 16 after amplification by the amplifier 2 is compared with the input command voltage and the gain of the low frequency component of the signal corresponding to the difference is adjusted, a lead filter 5 for phase compensation, low pass filters 6, 7 which cut the resonance at unneeded regions, and a drive amplifier 8.

In the micro-positioning tool post control system of the aforesaid arrangement, since the estimate x the velocity signal is produced in the state observer 3 as described above and this estimate is fed back to the voltage applied to the piezoelectric actuator, there is realized an improvement not only in the static characteristics, dynamic characteristics and static stiffness but also in the dynamic stiffness.

An embodiment of the invention will now be described.

The main micro-positioning tool post unit 1 of the structure shown in FIG. 2 is constituted of a steel block having an N-shaped slit. The walls at the four corner portions of the block are notched so as to give them a thickness of 3 mm. As a result, the tool stage is flexible only along an axis running fore and aft. A piezostack (PZT $\phi 10 \times 0.6t \times 25$ layers) is accommodated inside the block. The elongation of this actuator is transmitted at a 1:1 ratio to the tool stage fitted at its tip with a diamond tool and the resulting amount of displacement is detected by a capacitance-type non-contact displacement gage (5 nm resolution) provided to the rear of the tool stage.

Figure 3A:
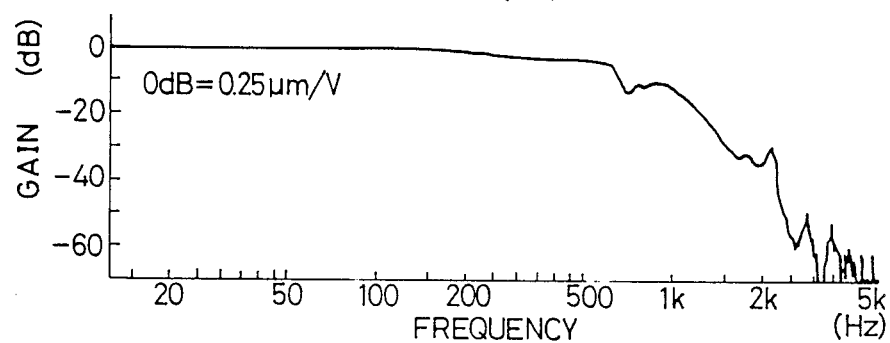
FIGS. 3(a) and 3(b) are Bode diagrams showing the frequency characteristics of the micro-positioning tool post according to the present invention.
Figure 3B:
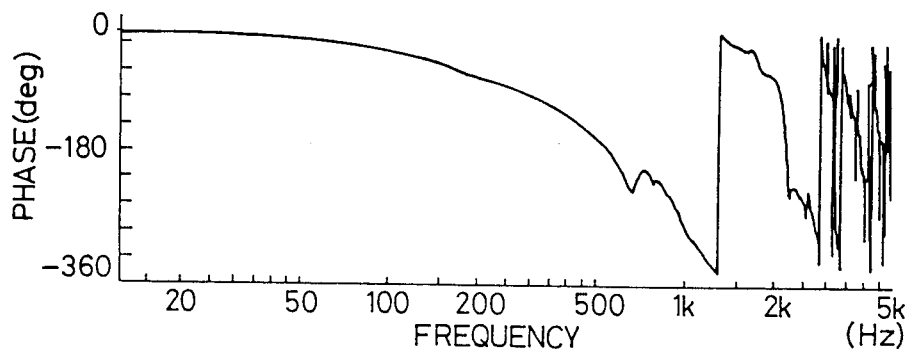

FIGS. 3(a) and 3(b) show the frequency characteristics of this micro-positioning tool post in the case where it is applied with the present invention. It will be noted that smoothing of the frequency response is realized.

FIGS. 4(a) and 4(b) show the calculated compliance transfer function, which is the inverse function of the dynamic stiffness, for the case of the present invention (curve S) and, for comparison, for the cases of a micro-positioning tool post not provided with a closed-loop control system (i.e. an open-loop micro-positioning tool post) (curve O) and of a micro-positioning tool post provided with a conventional control system employing a notch filter (curve N). It will be noted from the curves O and N that both conventional systems exhibit peaks at the resonance positions, meaning that the dynamic stiffness at these frequencies is greatly reduced. To the contrary, from curve S it will be noted that in the case of the present invention the peak at the resonance portion is suppressed, providing an effective improvement in dynamic stiffness.

Figure 5:
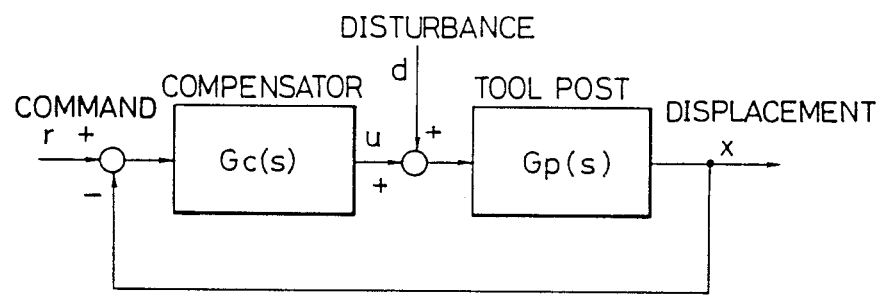
FIG. 5 is a block diagram illustrating how external disturbance acts on a micro-positioning tool post with a closed-loop control system.
Figure 7:
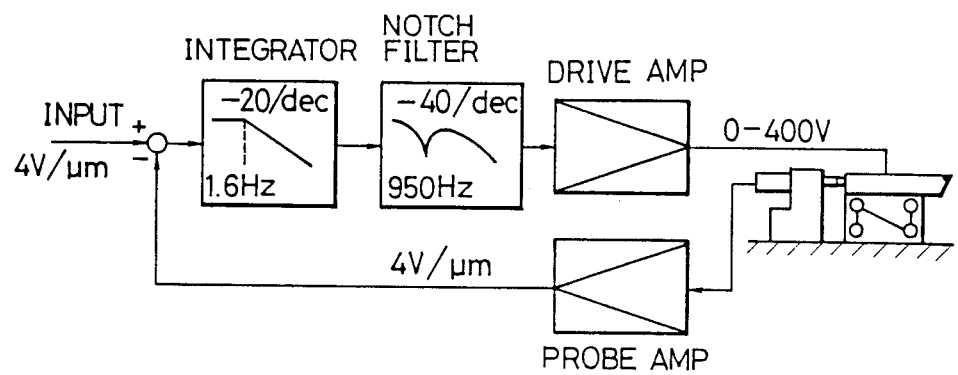
FIG. 7 is a block diagram of the notch filter control system of a conventional micro-positioning tool post.
Figure 6A:
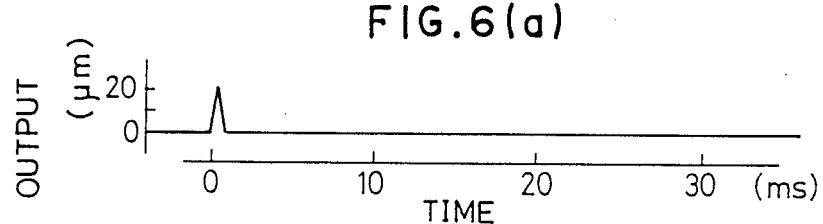
FIG. 6(a) is a diagram showing an impulse force applied to different micro-positioning tool posts for testing their displacement responses.
Figure 6B:
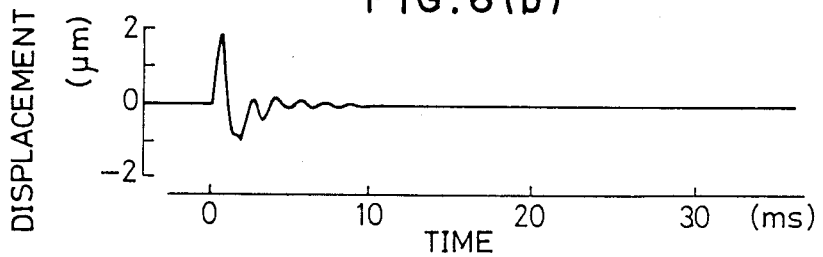
FIG. 6(b) is a diagram showing the displacement response when the impulse force of FIG. 6(a) was applied to the micro-positioning tool post of the present invention.
Figure 6C:
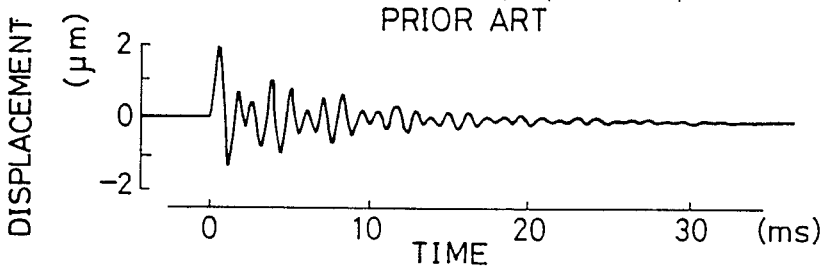
FIG. 6(c) is a diagram showing the displacement response when the impulse force of FIG. 6(a) was applied to a micro-positioning tool post with a conventional open-loop control system.
Figure 6D:
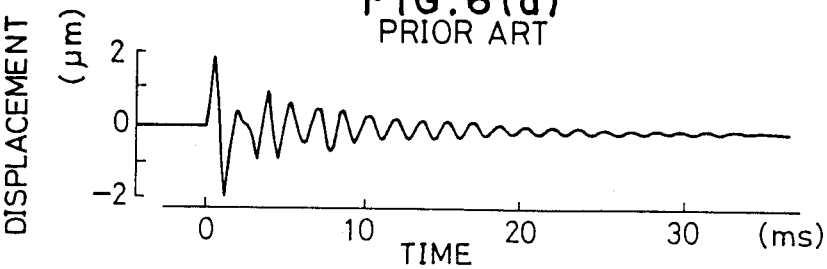
FIG. 6(d) is a diagram showing the displacement when the impulse force of FIG. 6(a) was applied to a micro-positioning tool post with a notch filter control system.

The minimization of the decrease in dynamic stiffness at the resonant frequency achieved by the closed-loop control system according to the present invention will now be explained with reference to FIG. 5 showing how external disturbance (cutting force) acts on a micro-positioning tool post with a closed-loop control system. Where the transfer functions of the micro-positioning tool post and the compensator are Gp(s) and Gc(s), respectively, the compliance transfer function Gd(s) from the external disturbance d to the displacement x is $$Gd(s) = x/d = Gp(s)/(1 + Gc(s) \cdot Gp(s))$$

In a notch-filter type closed-loop control system, Gp(s) has a resonance point and Gc(s) an antiresonance point which cancel each other in the denominator. As a result, the resonance characteristic Gp(s) of the numerator is reflected in Gd(s) so that at the resonance point the compliance rises markedly, meaning that there is a marked decrease in the dynamic stiffness. To the contrary, in the closed-loop control system employing a state observer according to the present invention, since Gc(s) does not have a resonance point, the resonance characteristic Gp(s) cancels out between the denominator and numerator so that there is no marked rise in the compliance transfer function Gd(s) at the resonance point and thus no marked decrease in the dynamic stiffness.

FIG. 6 shows the actual response of the system according to the present invention when external disturbance was applied. When an impulse force as shown in FIG. 6(a) was applied to the tool tip in the direction of thrust, the response of the micro-positioning tool post provided with the system according to the present invention was as shown in FIG. 6(b). For comparison, the responses of micro-positioning tool posts provided with conventional open-loop and notch filter type control systems are shown in FIGS. 6(c) and 6(d), respectively. As will be noted, in the micro-positioning tool posts employing the open loop and the notch filter, the vibration attenuates only slowly over a relatively long time whereas in the micro-positioning tool post according to the present invention, the vibration attenuates quickly.

As explained in the foregoing, in accordance with the present invention there can be provided a micro-positioning tool post equipped with a closed-loop control system which enables an effective improvement in the dynamic stiffness while also exhibiting excellent static characteristics, dynamic characteristics and static stiffness.

What is claimed is:

1. A micro-positioning tool post comprising:
   a tool stage which supports a tool and is supported on a flexible support so that the tool stage performs motion parallel to said flexible support;
   a piezoeletric actuator for displacing said tool stage;
   a displacement sensor for detecting displacement of said tool stage;
   a state observer which is a dynamical system for computing an estimate of a velocity signal of said tool stage from a voltage applied to said piezoelectric actuator and an output from said displacement sensor; and
   means for feeding said estimate of the velocity signal back to the voltage applied to said piezoelectric actuator;
   whereby said tool may be micro-positioned relative to a work piece.

2. The micro-positioning tool post according to claim 1, wherein said state observer produces an estimate x of a velocity signal x of said tool state from the voltage u applied to said piezoelectric actuator and the output x from said displacement sensor in accordance with the formulas:

$$z = (-\omega_0^2 - l)z + (-2\zeta\omega_0^2 + l)l)x + ku \text{ and } x = Z + lx,$$

in which k, $\zeta$ and $\omega_0$ represent a sensitivity coefficient, a natural damping coefficient and a natural angular frequency, respectively, which are characteristic parameters of said tool post, l is an arbitrary positive integer of sufficient magnitude, and z is a variable.

3. A method of controlling a micro-positioning tool post, which comprises the steps of:
   supporting a tool on a flexible support which performs parallel motion;
   displacing said flexible support by means of a piezoelectric actuator;
   detecting displacement of said tool using a displacement sensor;
   computing an estimate of a tool velocity signal from a signal input to said piezoelectric actuator and a detection signal from said displacement sensor;
   feeding the computed estimate back to the voltage applied to said piezoelectric actuator; and
   micro-positioning said tool relative to a work piece.

4. The method according to claim 3, wherein said estimate x of the tool velocity signal x is computed from the voltage u applied to said piezoelectric actuator and the output x from said displacement sensor in accordance with the formulas:

$$z = (-\omega_0 - l)z + (-2\zeta\omega_0 - (\omega_0^2 + l)l)x + ku \text{ and}$$
$$X = Z + lx,$$

in which k, $\zeta$ and $\omega_0$ represent a sensitivity coefficient, a natural damping coefficient and a natural angular frequency, respectively, which are characteristic parameters of said tool post, l is an arbitrary positive integer of sufficient magnitude, and z is a variable.

* * * * *